United States Patent [19]

Motsinger et al.

[11] Patent Number: 4,944,362
[45] Date of Patent: Jul. 31, 1990

[54] CLOSED CAVITY NOISE SUPPRESSOR

[75] Inventors: Russell E. Motsinger, Cincinnati, Ohio; John W. Vdoviak, Marblehead, Mass.

[73] Assignee: General Electric Company, Cincinnati, Ohio

[21] Appl. No.: 275,993

[22] Filed: Nov. 25, 1988

[51] Int. Cl.5 .......................... B64F 1/26; F02K 1/82
[52] U.S. Cl. .................................... 181/213; 181/286; 181/288; 181/292; 181/293
[58] Field of Search ............... 181/213, 214, 222, 224, 181/285, 286, 288, 292, 293

[56] References Cited

U.S. PATENT DOCUMENTS

| | | | |
|---|---|---|---|
| 3,437,173 | 4/1969 | Ehrich | 181/213 |
| 3,819,007 | 6/1974 | Wirt et al. | 181/286 |
| 4,150,732 | 4/1979 | Hock et al. | 181/213 |
| 4,189,027 | 2/1980 | Dean, III et al. | 181/286 |
| 4,645,032 | 2/1987 | Ross et al. | 181/250 |
| 4,747,467 | 5/1988 | Lyon et al. | 181/218 |
| 4,821,841 | 4/1989 | Woodward et al. | 181/286 |

Primary Examiner—Benjamin R. Fuller
Attorney, Agent, or Firm—Jerome C. Squillaro

[57] ABSTRACT

An annular acoustic liner for gas turbine engine ducts comprising Helmholtz resonator chambers wherein the resonator's turnable neck length and chamber depth lie on a surface which is concentric to the liner centerline. In another embodiment of the invention the liner is generally rectangular and the resonator's turnable neck length and chamber depth lie on a surface which is parallel to the duct flow. A more particular embodiment of the invention the duct is an afterburner duct which may have a rectangular or circular cross section.

13 Claims, 5 Drawing Sheets

CLOSED CAVITY NOISE SUPPRESSOR

The invention herein described was made in the course of or under a contract or subcontract thereunder (or grant) with the Department of the Navy.

BACKGROUND OF THE INVENTION

1. Field of the Invention

This invention relates to gas turbine engines and more particularly to Helmholtz resonator-type acoustic liners for fluid-flow ducts, such as the fan duct or afterburner exhaust duct, of gas turbine engines.

2. DESCRIPTION OF THE KNOWN ART

Modern gas turbine engines operate over a broad range of speeds and thrusts thereby generating a broad range of noise frequencies. This together with ever more stringent noise abatement requirements around the world pose great challenges to the aircraft engine designer. Modern day gas turbine engine designers are always striving to design acoustic liners which are effective in absorbing noise over a broad range of frequencies and yet economical with respect to the space they occupy. Further design considerations are durability, weight and ease of fabrication. Particular applications for these acoustic liners are in the fan ducts and exhaust ducts of gas turbine engines. Another application is in the exhaust duct of a gas turbine engine incorporating an augmentor, wherein the acoustic liner is used to overcome a particularly difficult noise problem referred to as screech.

A most commonly used type of acoustic liner is multilayer-type, in which a bulk fiber-filled or compartmented-airspace core is provided with a permeable core facing laYer. The core facing layer is usually a sheet fabricated from sintered or felted metal or other porous materials having relatively large flow resistances. The drawback to this type of acoustic liner is its poor durability serviceability and the large thickness required to suppress low frequency noise as encountered in afterburner screech.

This problem can be overcome with the use of Helmholtz resonator chamber or compartments as in U.S. Pat. No. 3,819,007 which provides a compartmented airspace core with a permeable facing layer having apertures through it, each aperture having a collar in the form of a short duct, one end of which is flush with the outer (sound receiving) surface of the facing sheet, the other end of which projects into the interior of a respective compartment of the core. This type of Helmholtz resonator with the neck situated internally of the resonant volumes and perpendicular to the flow provide good noise attenuation over a relatively narrow band of low frequencies centered about a particular low frequency to which the resonators are tuned. Economy with respect to space is improved due to the fact that the Helmholtz resonator necks are internal of the resonant volumes.

However, a problem still remains if it is desired to efficiently absorb a broader band of low frequencies using such an acoustic liner, due to the relatively narrow-band frequency response of the Helmholtz resonators. Furthermore, the design requires resonator chamber depths and neck lengths that add significant radial width to the ducts thereby incurring additional unwanted weight and size. In particular the available designs of the prior art add significant thickness to afterburner liners in the exhaust ducts of high performance gas turbine engines thereby adding to the diameter installation envelope.

OBJECTS OF THE INVENTION

It is, accordingly, an object of the present invention to provide a new Helmholtz-type/ resonating chamber for use in ducts of gas turbine engines.

A further object of the present invention is to provide a relatively thin acoustic liner for gas turbine engine ducts.

It is another object of the present invention to provide a thin acoustic liner with reduced cooling requirements for ducts in gas turbine engines.

It is another object of the present invention to provide an acoustic liner for gas turbine engine ducts having a relatively small annular cross section.

Another object of the present invention is to provide a relatively thin acoustic liner for a gas turbine engine that can be used to attenuate noise over a range of frequencies from 100-3000 Hz.

A further object of the present invention is to provide an acoustic liner for a gas turbine engine duct that can be easily manufactured, installed, maintained, and is low in weight.

Yet another object of the present invention is to reduce screech from the afterburner of a gas turbine engine, with reduced throughput cooling air flow.

SUMMARY OF THE INVENTION

Accordingly one form of the present invention provides A Helmholtz resonator-type chamber for attenuating noise in a duct containing a gas flow comprising a chamber and a neck wherein the tunable neck length and chamber resonating depth run in a plane parallel to the gas flow.

In one particular embodiment of the present invention the tunable neck length and chamber resonating depth run in a plane parallel to or concentric to and in the same direction as the gas flow.

In another particular embodiment of the present invention the tunable neck length and chamber resonating depth run in a plane parallel to or concentric to and in a direction perpendicular to the gas flow.

A more particular form of the present invention provides an acoustic liner for a gas turbine engine annular duct comprising a plurality of Helmholtz resonator-type chambers having neck lengths and chamber resonating depths running circumferentially with respect to the duct.

One embodiment of the present invention provides an acoustic liner for a gas turbine engine duct comprising a plurality of Helmholtz resonator type chambers having neck lengths and chamber resonating depths running circumferentially with respect to the duct and wherein the neck occupies a portion of said chamber nearest the gas flow.

Another embodiment of the present invention provides an acoustic liner for a gas turbine engine duct comprising a plurality of Helmholtz resonator type chambers having neck lengths and chamber resonating depths running axially with respect to the duct and wherein the neck occupies a portion of said chamber nearest the gas flow.

Yet Another embodiment of the present invention provides an acoustic liner for a gas turbine engine duct comprising a plurality of Helmholtz resonator type chambers having neck lengths and chamber resonating depths running parallel with respect to the duct and wherein the neck occupies a portion of said chamber nearest the gas flow.

Another more particular embodiment of the invention provides an acoustic liner for a gas turbine engine duct comprises a bifurcated compartment containing two resonating chambers and necks. Said compartment, including an entrance to said compartment, comprises a band having a first plurality of large inverted T-shaped elements depending from the band wherein said entrance lies between the spaced apart tops of adjoining large T-shaped elements. Said chambers and necks are formed by a second plurality of smaller inverted T-shaped elements depending from the band and centered between said two adjoining large T-shaped elements. Said necks comprise the spaces between the tops of the small and large T-shaped elements.

DETAILED DESCRIPTION OF THE INVENTION

Figure 1:
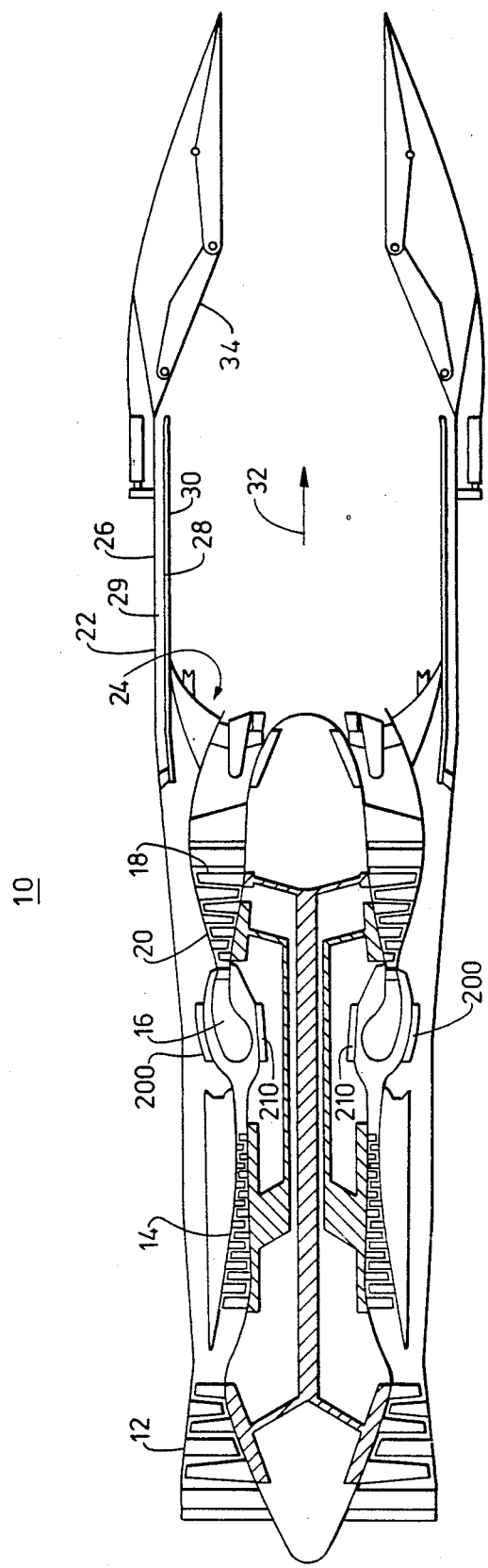
FIG. 1 is a schematic cross section of a gas turbine engine with an afterburner and exhaust duct.

Referring to FIG. 1, a typical gas turbine engine 10 is shown including a fan section 12 and a compressor section 14. A combustion section 16 receives the compressed air from the fan 12 and compressor 14 sections respectively and flows the hot combustor gases to the high pressure turbine 20, which powers the compressor section 14, and then the low pressure turbine 18, which powers the fan section 12. The gases are then flowed into an exhaust section 22 which includes an afterburner 24, a cooling liner 30, and a nozzle 34. The afterburner 24 is usually used for burning more fuel in order to produce additional thrust for short periods of time such as during takeoff, climb and during combat maneuvers. The exhaust section 22 contains gas flow 32, is circumscribed by an annular case 26 having an acoustic liner 28 and a cooling plenum 29 therebetween. The afterburner system may also be referred to as an augmentor or afterburner.

Figure 2:
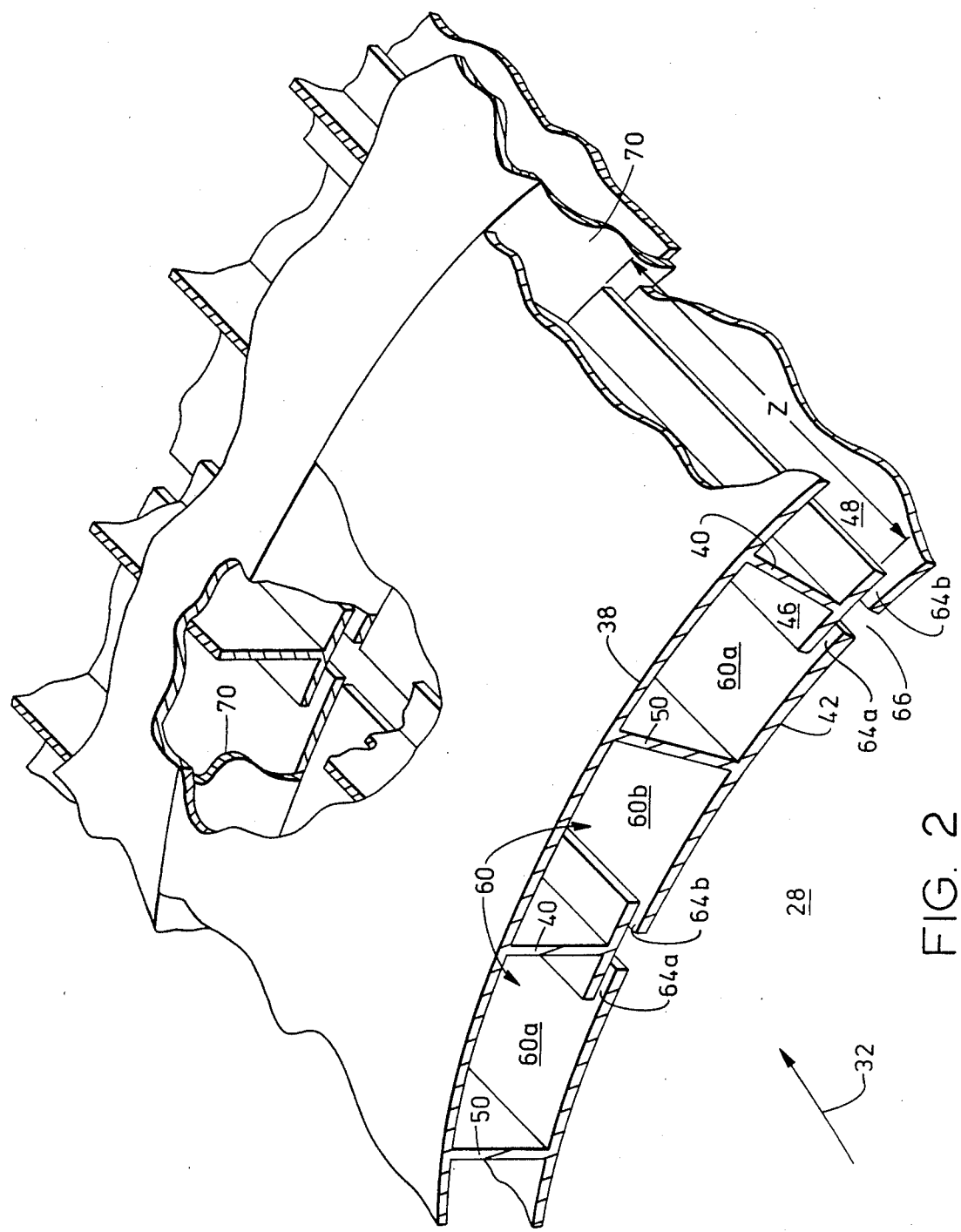
FIG. 2 is a partly "cut-away" perspective view of one embodiment of the invention.

FIG. 2 depicts the details of one embodiment of the present invention which is the acoustic liner 28 in FIG. 1. The acoustic liner 28 comprises a plurality of annularly disposed bifurcated compartments 60 which are generally rectangular or annular in shape. Resonating chambers 60a and 60b are formed by the bifurcation of compartment 60. Compartments 60 are disposed radially apart from and inward of case 26 which is shown in FIG. 1. Compartment 60, which is shown as being annular in FIG. 2, may be rectangular for ease of construction or for use in a two-dimensional flow duct. Compartment 60 and associated resonating chambers 60a and 60b are formed by an annular band 38 from which depend radially inward in alternating fashion, small T-shaped elements 40 and large T-shaped elements 50. The T shape refers to the cross section shape of the elements. The, axially spaced walls of each bifurcated compartment 60 and associated chambers 60a and 60b are formed by bulkheads 70. The large T-shaped elements 50 are circumferentially spaced so that the tops of adjoining T's form an entrance 66 to the compartment. The small T's 40 are centered between adjoining large T-shaped elements 50 thereby forming the two Helmholtz resonating chambers 60a and 60b within compartment 60. Furthermore, the small T's are sized so that their tops 46 in cooperation with the large T's tops 42 form necks 64a and 64b of Helmholtz resonating chambers 60a and 60b, respectively. The depth or axial length of the chambers 64a and 64b is Z, which is the length of the small and large inverted T-shaped elements 40 and 50 in the axial direction with respect to the engine or the direction of the gas flow 32.

Figure 3:
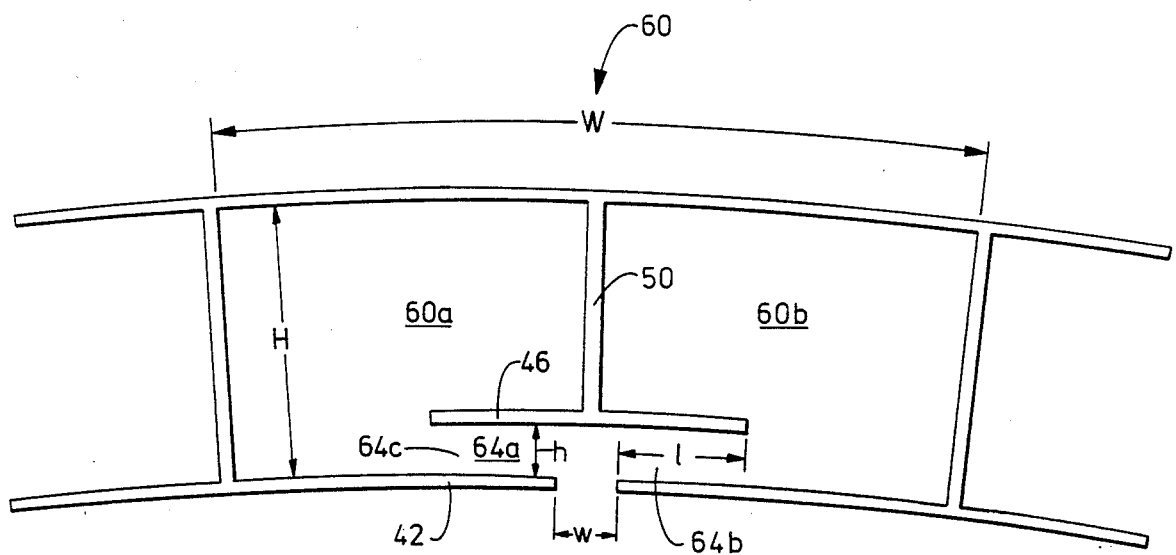
FIG. 3 is a front view schematic cross section of the structure of FIG. 2.

FIG. 3 is a cross section of the chambers 60a and 60b showing the design parameters of the Helmholtz resonating chambers. Below are listed the equations used to determine the frequency of the noise the liner is designed to absorb or attenuate. The compact nature of the design is readily apparent by the fact that the variable or tunable elements of resonating chambers 60a and 60b run circumferentially thereby allowing the liner to be very narrow having a small height H thereby minimizing any adverse effects on the size design or performance of the gas turbine engine. The invention can be employed in numerous ways wherein a desired frequency f can be attenuated by adjusting the appropriate parameters shown in FIG. 3 according to the following formulas.

$$f = (c/2\pi)[A/(L'V)]^{\frac{1}{2}}$$

wherein
$A = hZ$
$L' = 1 + ah$
$V = H(W/2)Z - [h(1+w/2)Z]$
c = speed of sound
Z = axial length of the chamber
h = height of the neck
l = length of the neck including an end correction factor, a.
W/2 = depth or width of the chamber
A = open area of the neck
V = volume of the resonating chamber As can be readily seen the parameter Z in the formula cancels out reducing the formula for frequency to the following.

$$f = (c/2\pi)[h/[L'(W/2) - h(1+w/2)]]^{\frac{1}{2}}$$

The symbol a is an empirically derived factor depending on the sound pressure level and flow mach number. The preferred embodiment of the invention uses a value of about 0.8.

Figure 4:
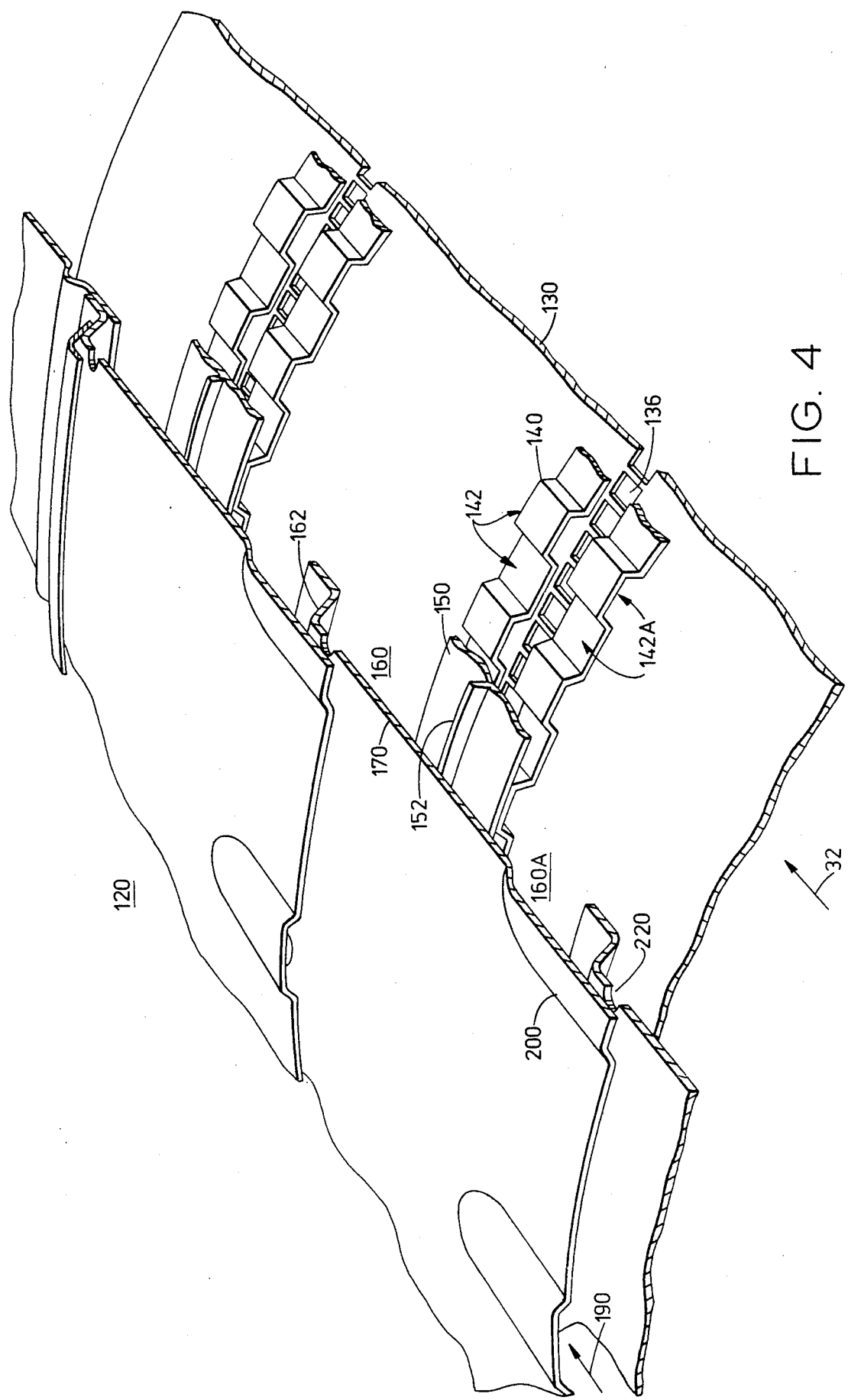
FIG. 4 is a partly "cut-away" perspective view of a second embodiment of the invention.
Figure 5:
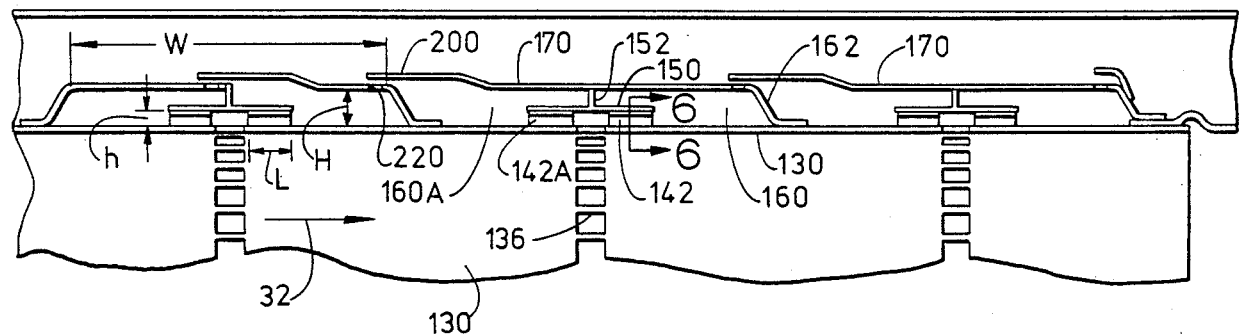
FIG. 5 is a schematic cross section of the structure of FIG. 4.

FIG. 4 depicts the details of another embodiment of the present invention which is the acoustic liner 28 in FIG. 1. An acoustic liner 120 comprises an inner wall or a facing 130 and an outer wall 170 which in turn help form a plurality of axially disposed annular compartments 160 and 160A which are parallel to the duct flow 32. The compartments 160 and 160A act as the resonating chambers. Noise enters the chambers through a plurality of apertures 136 disposed in axially spaced apart circumferential rows in annular inner wall 130. The apertures 136 are shown having a square shape in the preferred embodiment but may have other shapes such as rectangular. The necks 142 and 142A of the respective Helmholtz resonating chambers 160 and 160A are formed by a wiggle strip 140 which is a corrugated strip and forms nearly rectangular passages for necks 142 and 142A. As seen in FIG. 5 the tunable resonator chamber depth W/2 and neck length L are oriented or run in the same direction as or parallel to the flow 32. Chamber 160 includes a back wall 162 which in part defines the tunable chamber depth W/2.

Figure 6:
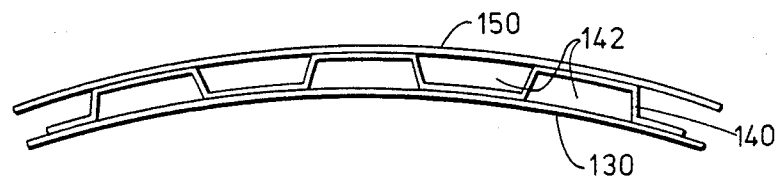
FIG. 6 is a front view schematic cross section of the structure of FIG. 5.

This particular embodiment is designed for the liner of an afterburner and therefore usually requires a means of cooling the liner 120. Cooling is very important to various embodiments and applications of this invention. This embodiment employs a very unique method of cooling whereby apertures 136 which admit the noise in the form of sound waves also exhaust the hot air in chambers 160 and 160A thereby cooling the entire liner. Included in this embodiment is a chamber cooling means comprising a cooling air scoop 200 which allows cooling air 190 to enter the front of the compartment and also hole 220 for the rear of the compartment and which uses apertures 136 to allow cooling air 190 to exit the compartments thereby removing heat. Support member 152 supports band 150 and is attached to the radially outer annular wall 170. The radially outer wall 170 helps form the compartments 160 and 160A and is normally cooled. The wiggle strip 140 is attached to the normally hot inner annular wall 130 thereby allowing differences in radial and axial thermal growth. FIG. 6 shows a cross section of necks 142 formed by wiggle strip 140, inner wall 130 and band 150.

Both embodiments of the invention depicted in FIG. 2 and FIG. 4 respectively are sized to attenuate the desired frequency or frequencies according to the previous formula for f. The advantage of the invention is that the tunable chamber depths and neck lengths can be greatly varied without dramatically effecting the thickness of the liner. This gives the designer great latitude in designing thin acoustic liners which eliminate screech and other unwanted noise but have a minimal effect on engine weight and duct airflow blockage.

The invention may be used to attenuate noise generated in commercial type aircraft engines without afterburners as well. One particularly important advantage for the invention's use on an aircraft gas turbine engine is its compact design as seen by its relatively narrow annular cross section.

Figure 7:
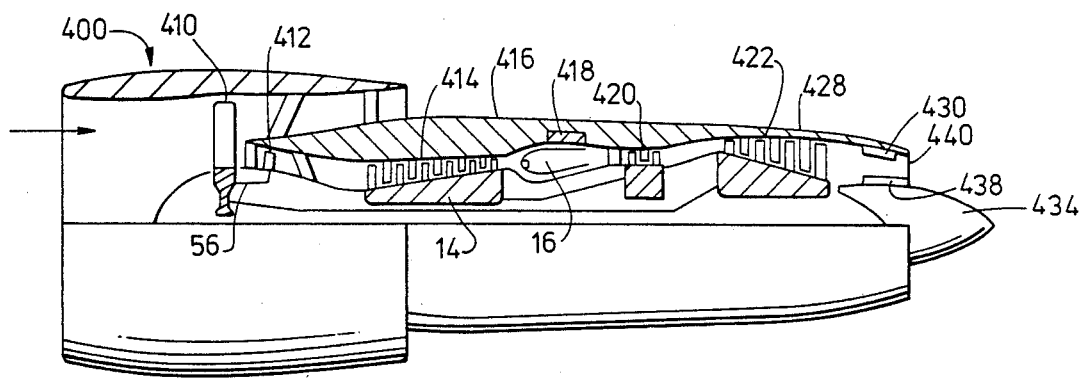
FIG. 7 is a schematic cross section of a commercial type gas turbine engine with a tail cone and exhaust duct.

The invention has three more particular embodiments for use in aircraft gas turbine engines as shown in FIG. 7. The three include the combustor and the radially outer wall and tail cone of the exhaust nozzle. The gas turbine engine 400 shown in FIG. 7 is a typical modern day high bypass ratio engine 110 including, in serial flow communication, a low compressor 412, a high compressor 414, a combustor section 416, a high pressure turbine section 420, a low pressure turbine section 422 and an exhaust section 428. The invention may be used as a combustor acoustic liner 418 for attenuating combustor generated noise. The invention may also be used in the exhaust section 428 as an exhaust outer wall duct acoustic liner 430. Tail cone 434 located at least partially within the exhaust section 428 is used to form a nozzle 440 and may also employ the present invention as a tail cone acoustic liner 438 to attenuate noise which can emanate from the exhaust of engine 400. The acoustic liners are useful in suppressing noise generated in the combustor which have a frequency or frequencies in the range of 100-800 Hz.

The invention need not be limited to circular ducts but, as can be readily seen, may be used for ducts having rectangular on other cross sections as well since the tunable variables may be linear as well as curvilinear.

The foregoing specification sets forth the invention in its preferred embodiment and practical forms but the structure shown is capable of modification within a range of equivalents without departing from the spirit and scope of the invention which is to be understood is broadly novel as is commensurate with the appended claims.

We claim:

1. An acoustic liner for a gas turbine engine duct comprising:
    an inner annular facing;
    an outer annular wall spaced radially apart from said inner annular facing;
    a plurality of annular Helmholtz resonator-type chambers having predetermined depths formed between said inner annular facing and said outer annular wall;
    said chambers including necks having predetermined lengths wherein said neck lengths and said chamber depths run in a direction parallel to the gas flow;
    an annular support member extending radially inward from said outer annular wall and forming at least a portion of axially spaced end walls of said chambers;
    said annular support member including an annular flange at a radially inner end of said support member and concentric with said annular wall having an axial length with respect to the engine that corresponds to said neck lengths of said chambers; and
    at least one circumferentially disposed wiggle strip mounted between said concentric annular flange and said inner annular facing forming at least a portion of said necks.

2. An acoustic liner as in claim 1 wherein said wiggle strip is a corrugated metal strip.

3. An acoustic liner for a gas turbine engine annular duct, comprising:
    inner and outer radially spaced apart annular walls;
    a plurality of annular Helmholtz resonator-type chambers formed between said annular walls;
    axially disposed forward and aft end walls forming ends of said chambers;
    said chambers including a plurality of necks disposed in an annular opening to formed between one of said end walls and said outer annular wall; wherein said necks includes predetermined neck lengths and said chambers include chamber depths running in a plane which is coannular with the engine duct;
    a plurality of circumferentially disposed apertures in said inner annular wall disposed with respect to said necks so as to form an acoustic opening from said duct to said neck; and
    a chamber cooling means mounted on said outer annular wall and in fluid communication with said chamber.

4. An acoustic liner as in claim 3 wherein said apertures are generally rectangular in shape.

5. An acoustic liner as in claim 3 wherein said apertures are generally square in shape.

6. An acoustic liner as in claim 3 wherein said chamber cooling means comprises a cooling air scoop formed on and located radially outward of said outer annular wall including a cooling path into said chamber.

7. An acoustic liner for a gas turbine engine annular duct, comprising:
inner and outer radially spaced apart annular walls;
a plurality of sets of axially spaced apart forward and aft annular Helmholtz resonator-type chambers formed between said annular walls;
axially disposed forward and aft annular end walls forming forward and aft ends respectively of said forward and aft chambers, said end walls generally radially disposed between said annular walls;
at least one annular middle wall axially disposed between said end walls and generally radially depending from said outer annular wall and radially spaced apart from said annular inner wall;
a third relatively short annular wall attached to the radially inner end of said middle wall and concentric with and radially spaced apart from with said inner annular wall;
forward and aft pluralities of necks disposed between said third and outer annular walls wherein said necks are formed by a wiggle strip having generally rectangular corrugations and disposed between said middle and inner annular walls and wherein said necks have neck lengths and said chambers have chamber depths running in a plane which is coannular with the engine duct; and
a plurality of circumferentially disposed apertures in said inner annular wall disposed with respect to said necks so as to form an acoustic opening from said duct to said necks.

8. An acoustic liner as in claim 7 wherein said apertures are generally rectangular in shape.

9. An acoustic liner as in claim 7 wherein said apertures are generally square in shape.

10. An acoustic liner as in claim 7 further comprising:
a chamber cooling means mounted on said outer annular wall and in fluid communication with said chamber.

11. An acoustic liner as in claim 7 wherein said chamber cooling means comprises a cooling air scoop formed on and located radially outward of said outer annular wall including a cooling path into said chamber.

12. A gas turbine engine exhaust section, comprising:
an afterburner duct liner including inner and outer radially spaced apart annular walls disposed within said exhaust section;
at least one annular Helmholtz resonator-type chamber disposed within said annular walls;
axially disposed forward and aft end walls forming the ends of said chamber;
said chamber including a plurality of necks disposed in an opening formed between one of said end walls and said outer annular wall, said necks having neck lengths and said chamber having chamber resonating depths running in a plane which is coannular with said annular walls;
a plurality of circumferentially disposed apertures in said inner annular wall disposed with respect to said necks so as to form an acoustic opening from said duct to said neck; and
a chamber cooling means mounted on said outer annular wall and in fluid communication with said chamber.

13. A gas turbine engine exhaust section as claimed in claim 12, wherein:
one of said end walls comprises at least one annular middle wall axially disposed between said end walls and generally radially disposed between said outer annular and inner walls and radially spaced apart from said annular inner wall;
said opening is formed by a third relatively short annular wall attached to a radially inner end of said middle wall and concentric with and radially spaced apart from said inner annular wall; and
forward and aft pluralities of necks disposed between said third and outer annular walls are formed by a wiggle strip having generally rectangular corrugations and disposed between said middle and inner annular walls and wherein said necks have neck lengths and said chambers have chamber resonating depths running in a plane which is coannular with said annular walls.

* * * * *